United States Patent
Chen et al.

(10) Patent No.: US 9,722,414 B2
(45) Date of Patent: Aug. 1, 2017

(54) POWER DISTRIBUTION AND INFORMATION HANDLING

(71) Applicant: LENOVO ENTERPRISE SOLUTIONS (SINGAPORE) PTE LTD., New Tech Park (SG)

(72) Inventors: Wei Tien Chen, New Taipei (TW); George Cheng, New Taipei (TW); Yulianti Darmanto, New Taipei (TW); Peter C Y Huang, Taipei (TW); JunHom Lin, Taipei (TW); W J Tseng, Taipei (TW)

(73) Assignee: Lenovo Enterprise Solutions (Singapore) PTE. LTD., New Tech Park (SG)

( * ) Notice: Subject to any disclaimer, the term of this patent is extended or adjusted under 35 U.S.C. 154(b) by 468 days.

(21) Appl. No.: 14/303,807

(22) Filed: Jun. 13, 2014

(65) Prior Publication Data
US 2014/0321015 A1     Oct. 30, 2014

Related U.S. Application Data

(63) Continuation of application No. 14/260,879, filed on Apr. 24, 2014.

(51) Int. Cl.
*H02H 3/10*     (2006.01)
*H02H 3/38*     (2006.01)
(Continued)

(52) U.S. Cl.
CPC ............. *H02H 3/38* (2013.01); *G06F 1/28* (2013.01); *H02H 3/087* (2013.01); *H02H 3/10* (2013.01)

(58) Field of Classification Search
CPC ............. H02H 3/10; H02H 3/38; H02H 3/087
(Continued)

(56) References Cited

U.S. PATENT DOCUMENTS 7,656,637 B2    2/2010    McAvoy et al.
8,217,621 B2    7/2012    Tsai et al.
(Continued)

FOREIGN PATENT DOCUMENTS

CN    101614773    12/2009
CN    201774156    3/2011
(Continued)

OTHER PUBLICATIONS

Kankanala, et al., "Optimal Control of Voltage and Power in a Multi-Zonal MVDC Shipboard Power System", Power Systems, IEEE Transactions on (vol. 27 , Issue: 2 ), Jan. 23, 2012, 642-650 pages.
(Continued)

*Primary Examiner* — Zeev V Kitov
(74) *Attorney, Agent, or Firm* — Jason Friday

(57) ABSTRACT

A method includes supplying power from a power supply to a first electrical circuit breaker. The method includes detecting whether at least one of a current and a voltage of the power has exceeded an operating threshold for the first electrical circuit. The method includes, in response to detecting that at least one of the current and the voltage of the power has exceeded the operating threshold for the first electrical circuit, shutting off the power supply and the first electrical circuit breaker. The method includes in response to detecting that at least one of the current and the voltage of the power has not exceeded the operating threshold for the first electrical circuit, supplying the power from the power supply to the second electrical circuit breaker that is electrically coupled to the second electrical circuit.

20 Claims, 10 Drawing Sheets

(51) Int. Cl.
    *H02H 3/087*    (2006.01)
    *G06F 1/28*     (2006.01)
(58) Field of Classification Search
    USPC ....................................................... 361/79, 86
    See application file for complete search history.

(56) References Cited

U.S. PATENT DOCUMENTS

| | | |
|---|---|---|
| 2007/0064360 A1 | 3/2007 | DeBoer et al. |
| 2009/0228224 A1 | 9/2009 | Spanier et al. |
| 2012/0022713 A1 | 1/2012 | Deaver, Sr. et al. |
| 2012/0179929 A1* | 7/2012 | Chen .......................... G06F 1/28 713/330 |
| 2012/0206847 A1* | 8/2012 | Hung ..................... H02H 3/087 361/100 |

FOREIGN PATENT DOCUMENTS

| | | |
|---|---|---|
| CN | 102437484 | 5/2012 |
| EP | 2343620 | 7/2011 |
| TW | M410255 | 8/2011 |

OTHER PUBLICATIONS

Tsai, et al., "Layout Consideration and Circuit Solution to Prevent EOS Failure Induced by Latchup Test in a High-Voltage Integrated Circuits", Device and Materials Reliability, IEEE Transactions on (vol. PP , Issue: 99 ), Jun. 27, 2012, 1 page.
Taiwanese Office Action and Search Report for priority TW Application No. 102115503 dated Jun. 12, 2015, 4 pp.

\* cited by examiner

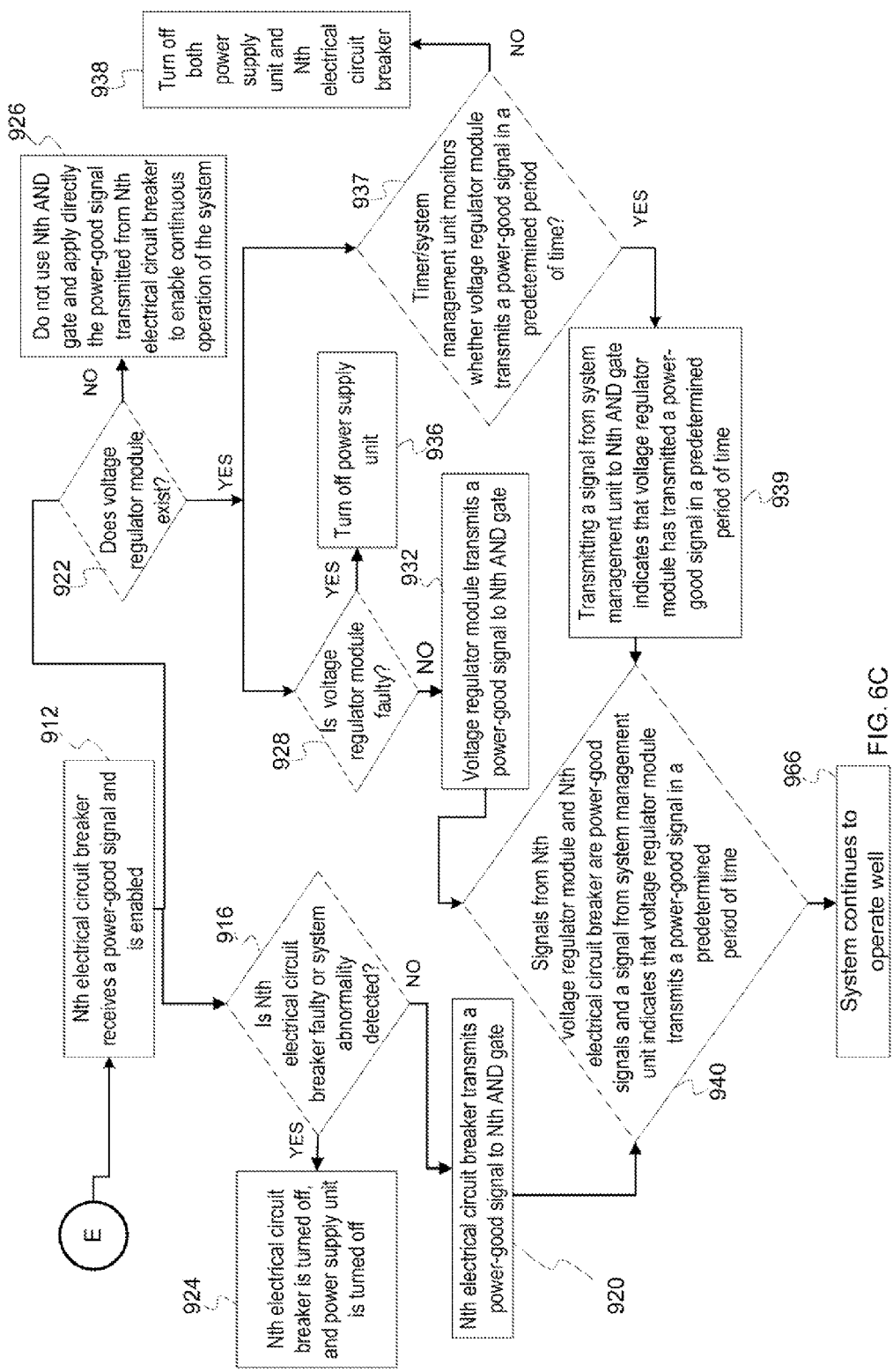

POWER DISTRIBUTION AND INFORMATION HANDLING

RELATED APPLICATIONS

This application is a continuation and claims the benefit of priority from U.S. patent application Ser. No. 14/260,879, filed on Apr. 24, 2014, which is based on and claims the benefit of priority from Taiwan Patent Application 102115503 filed on Apr. 30, 2013.

BACKGROUND

Embodiments of the inventive subject matter generally relate to power distribution, and more particularly, to power distribution in an information handling system.

Due to persistent improvement and development of components for use with information handling systems, applicable printed circuit boards and components mounted thereon are increasingly intricate. Accordingly, it is imperative to carry out effective thermal management for the printed circuit boards and components thereon.

In a conventional information handling system, a plurality of printed circuit boards typically carry, interconnect and power various components. The printed circuit boards operate at a high power level, and thus the components mounted on the printed circuit boards are likely to burn, be carbonized, or ignite. The mentioned kinds of damage are unwanted.

In a conventional computer system, a server or a mobile computer system typically comprises a circuit board, a power supply unit (PSU), a power plane, and a plurality of power rails. A large amount of heat easily accumulates at a specific portion of each of the aforesaid components. Furthermore, the aforesaid components lack any good protection mechanism. As a result, there is currently great concern about severe combustion and damage of the aforesaid components.

For example, components which are likely to accumulate excessive heat include, are not limited to, a plurality of voltage regulator modules (VRM) for supplying power to the components in the computer system. The plurality of voltage regulator modules include a voltage regulator module which supply a voltage to a central processing unit (CPU), a voltage regulator module which supply a voltage to a memory, and a voltage regulator module which supply a voltage to a hard disk drive. The voltage regulator modules perform voltage transformation to thereby supply appropriate voltages to the CPU, the memory, and the hard disk drive.

Each of the voltage regulators or the other components is often equipped with a high-integration chip and often has a protective logical circuit. Due to each voltage regulator being equipped with a high-integration chip, if a portion of the chip is damaged, heat generated will accumulate at the damaged portion of the chip, and the temperature of the damaged portion of the chip will increase abruptly. As a result, the printed circuit board or similar means is likely to ignite and smolder. Although each of the voltage regulators or the other components has the protective circuit, the protective circuit provides only one-time protection. For example, although the protective circuit serves a protective purpose such that the computer system stops being supplied with power and shuts down, the protective circuit may have burnt at this time.

When one of the protective circuits has been burnt, an ignorant user may restart the computer system or the computer system itself may restart. As a result, the voltage is applied to the printed circuit board or components to generate an abnormally large current such that severe damages may happen on the chips or a related portion of the printed circuit board or similar means may burn, smolder, or ignite.

In other words, the one-time protective logical circuit is incapable of providing protection beyond at point when the circuit is damaged, in particular, with the trend of ever-increasing integration of chips, severe combustion and damage of the printed circuit board or components can happen.

The aforesaid combustion and damage is not solely attributed to voltage regulators, but the other electronic components can also encounter the similar problem. Hence, with regard to electronic components mounted on printed circuit board, it is imperative to find a solution concerning short-circuit/burnout which can occur for different reasons, including but not limited to short-circuit/burnout due to an overly large current generated as a result of a user's restarting the computer system manually or the spontaneous restart of the computer system. At present, conventional approaches have not yet provided any solution to how to achieve multiple-time protection.

SUMMARY

In some embodiments, a method includes supplying power from a power supply to a first electrical circuit breaker, wherein a first electrical circuit is electrically coupled to receive the power from the power supply through the first electrical circuit breaker. The method includes detecting, by the first electrical circuit breaker, whether at least one of a current and a voltage of the power has exceeded an operating threshold for the first electrical circuit. The method includes, in response to detecting that at least one of the current and the voltage of the power has exceeded the operating threshold for the first electrical circuit, shutting off the power supply and the first electrical circuit breaker, wherein the shutting off of the power supply prevents supplying the power from the power supply to a second electrical circuit breaker that is electrically coupled to a second electrical circuit to receive the power from the power supply. The method includes in response to detecting that at least one of the current and the voltage of the power has not exceeded the operating, threshold for the first electrical circuit, supplying the power from the power supply to the second electrical circuit breaker that is electrically coupled to the second electrical circuit.

BRIEF DESCRIPTION OF THE DRAWINGS

The present embodiments may be better understood, and numerous objects, features, and advantages made apparent to those skilled in the art by referencing the accompanying drawings.

FIGS. 6A-6C depict flow charts of a power distribution method, according to some other embodiments.

DESCRIPTION OF EMBODIMENTS

The description that follows includes exemplary systems, methods, techniques, instruction sequences and computer program products that embody techniques of the present inventive subject matter. However, it is understood that the described embodiments may be practiced without these specific details. In other instances, well-known instruction instances, protocols, structures and techniques have not been shown in detail in order not to obfuscate the description.

Figure 1:
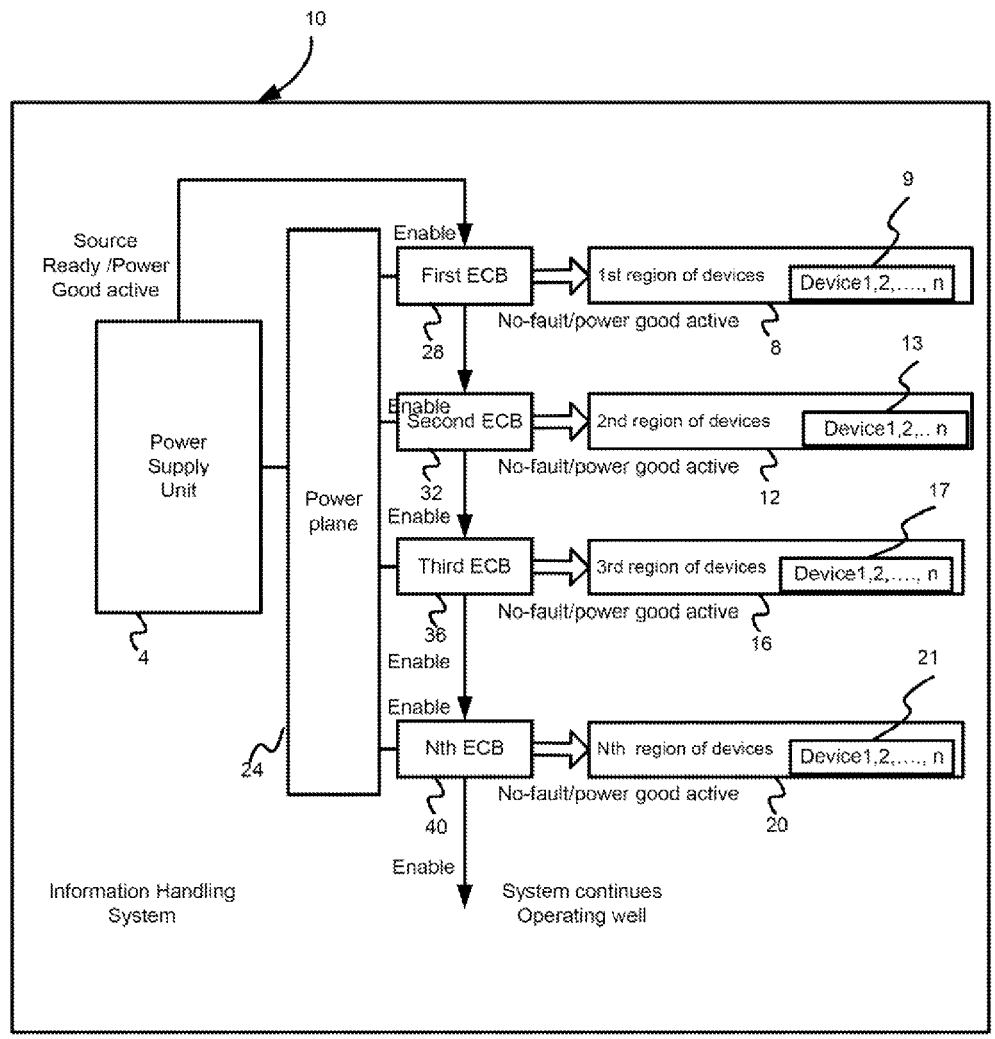
FIG. 1 depicts a block diagram of an information handling system, according to some embodiments.

FIG. 1 depicts a block diagram of an information handling system, according to some embodiments. FIG. 1 depicts the hardware architecture of an information handling system 10. The information handling system 10 includes a power supply unit (PSU) 4. A power plane 24 is electrically coupled to power supply unit 4. A first electrical circuit breaker (first ECB) 28, a second electrical circuit breaker (second ECB) 32, a third electrical circuit breaker (third ECB) 36, . . . , and an Nth electrical circuit breaker (Nth ECB) 40 are electrically coupled to the power plane 24. The information handling system 10 further comprises a first region of devices 8, a second region of devices 12, a third region of devices 16, . . . , and an Nth region of devices 20. The first region of devices 8, the second region of devices 12, the third region of devices 16, and the Nth region of devices 20 are electrically coupled to the first electrical circuit breaker (first ECB 28, the second electrical circuit breaker (second ECS) 32, the third electrical circuit breaker (third ECB) 36, . . . , and the Nth electrical circuit breaker (Nth ECB) 40, respectively. The details and operation of the components of the information handling system 10 are described later.

In some embodiments, the first region of devices 8, the second region of devices 12, the third region of devices 16, . . . , the Nth region of devices 20, the first electrical circuit breaker 28, the second electrical circuit breaker 32, the third electrical circuit breaker 36, and the Nth electrical circuit breaker 40 are disposed on a printed circuit board. The aforesaid components of which quantity can change as needed are operably interconnected. Optionally, the aforesaid components can communicate with each other or with the other components (not shown). The first region of devices 8, the second region of devices 12, the third region of devices 16, . . . , and the Nth region of devices 20 include functional modules, circuits, or devices in any forms, for example, including but not limited to a central processing unit (CPU), a memory, a hard disk drive, a voltage regulator module, and/or a module with a plurality of semiconductor components such as a module with complementary metal-oxide semiconductor components (including P-channel metal-oxide semiconductor components and N-channel metal-oxide semiconductor components). For example, the first region of devices 8 comprises 1, 2, . . . , n devices 9. The second region of devices 12 comprises 1, 2, . . . , n devices 13. The third region of devices 16 comprises 1, 2, . . . , n devices 17. The Nth region of devices 20 comprises 1, 2, . . . n devices 21.

The first electrical circuit breaker 28, the second electrical circuit breaker 32, the third electrical circuit breaker 36, . . . , and the Nth electrical circuit breaker 40 are typical electrical circuit breakers which provide conventional circuit protection.

Figure 2:
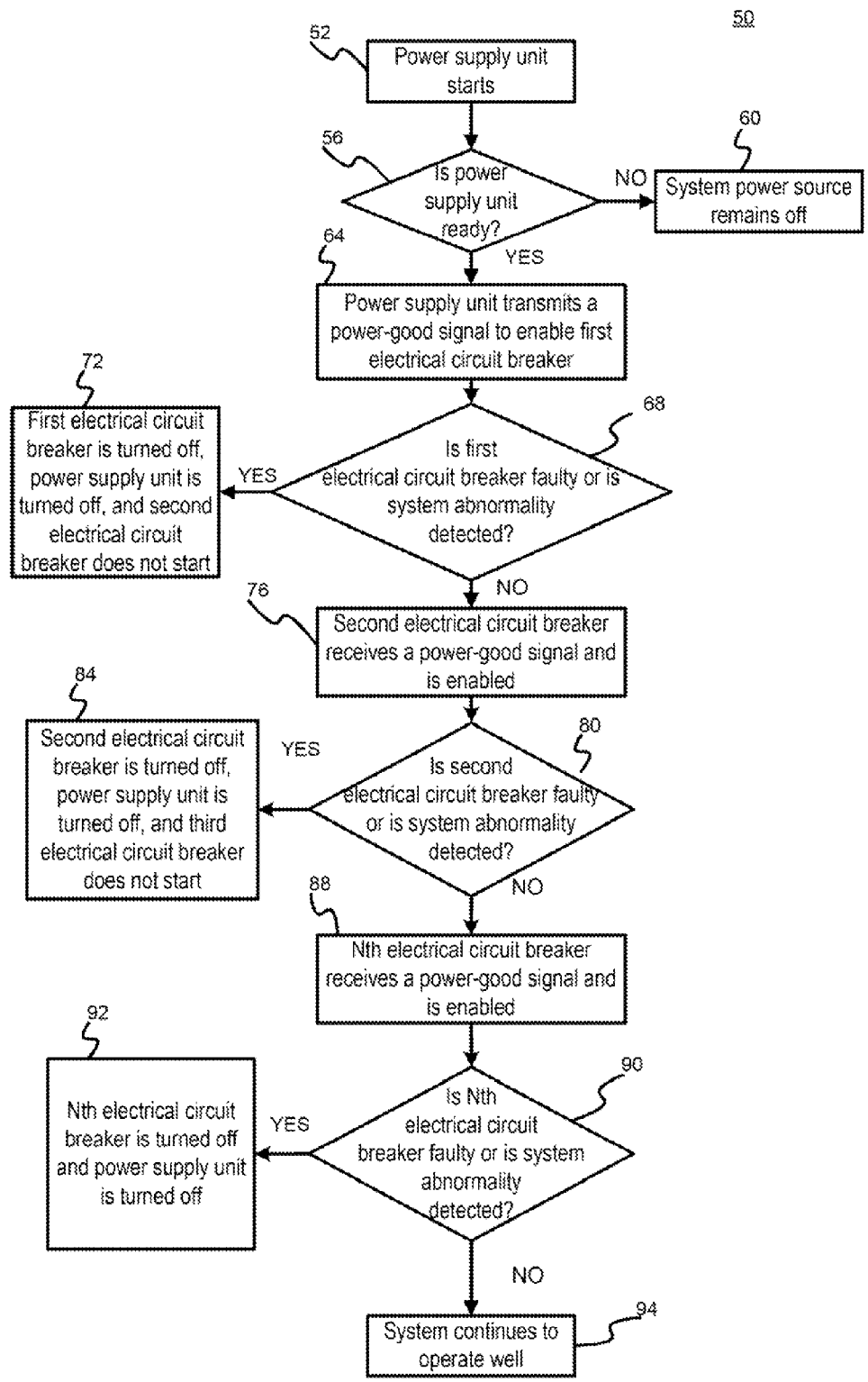
FIG. 2 depicts a flow chart of a power distribution method, according to some embodiments.

A power distribution technology provided according to some embodiments is illustrated hereunder with the hardware architecture shown in FIG. 1 and a flow chart shown in FIG. 2. FIG. 2 depicts a flow chart of a power distribution method, according to some embodiments. FIG. 2 depicts a flow chart 50 for use with the information handling system 10.

At block 52, the power supply unit 4 starts.

At block 56, a determination is made of whether the power supply unit 4 is read. In some embodiments, if the voltage does not reach a predetermined level or a power-good signal is not transmitted it can be determined that the power supply unit 4 is not ready. If the voltage reaches a predetermined level or a power-good signal is transmitted, it can be determined that the power supply unit 4 is ready.

At block 60, if it is determined that the power supply unit 4 is not ready, the system power source of the information handling system 10 will remain off. In some embodiments, the power supply unit 4 is a single power source of the information handling system 10. If the power supply unit 4 is not ready, the information handling stem 10 will keep its original state, that is the off state.

At block 64, if it is determined that the power supply unit 4 is ready, the power supply unit 4 will transmit a power-good signal to the first electrical circuit breaker 28, wherein the power-good signal functions as an enabling signal to enable first electrical circuit breaker 28.

At block 68, a detection is executed at the first electrical circuit breaker 28 to determine whether the first electrical circuit breaker 28 is faulty or whether there is a system abnormality. For example, if an abnormal current which is much higher than the rated current or an abnormal voltage level is detected at the first electrical circuit breaker 28, it will be determined that the first electrical, circuit breaker 28 is faulty or that the system abnormality is detected.

At block 72, if it is determined that the first electrical circuit breaker 28 is faulty or that the system abnormality is detected, both the first electrical circuit breaker 28 and the power supply unit 4 will be turned off, and second electrical circuit breaker 32 will not start. For example, the first electrical circuit breaker 28 can be turned off by means of a controller (not shown) thereof, and the power supply unit 4 can be turned off according to a signal indicative of a detected fault generated by the controller of the first electrical circuit breaker 28, in some embodiments, the first electrical circuit breaker 28 does not send any signal to start the other subsequent electrical circuit breaker (such as the second electrical circuit breaker 32).

At block 76, if it is determined that the first electrical circuit breaker 28 is not faulty or that the system abnormality is not detected, the second electrical circuit breaker will receive a power-good signal, and the second electrical circuit breaker 32 will be enabled.

At block 80, a detection is executed at the second electrical circuit breaker 32 to determine whether the second electrical circuit breaker 32 is faulty or whether there is a system abnormality. For example, if an abnormal current which is much higher than the rated current or an abnormal voltage level is detected at the second electrical circuit breaker 32, it will be determined that the second electrical circuit breaker 32 is faulty or that the system abnormality is detected.

At block 84, if it is determined that the second electrical circuit breaker 32 is faulty or that the system abnormality is detected, both the second electrical circuit breaker 32 and the power supply unit 4 will be turned off, and third electrical circuit breaker 36 will not start. For example, the second electrical circuit breaker 32 is turned off by means of a controller (not shown) thereof, and the power supply unit 4 is turned off according to a signal indicative of a detected fault generated by the controller of the second electrical circuit breaker 32. In some embodiments, the second electrical circuit breaker 32 does not send any signal to start the other subsequent electrical circuit breaker (such as the third electrical circuit breaker 36).

At block 86, if it is determined that the second electrical circuit breaker 32 is not faulty or that the system abnormality is not detected, the third electrical circuit breaker 36 will receive a power-good signal, and the third electrical circuit breaker 36 will be enabled.

The aforesaid operations can be performed on the subsequent electrical circuit breakers, regions of devices, and specific devices in regions of devices in sequence to test and determine whether the electrical circuit breakers are faulty for whether the system abnormalities are detected).

At block 88, if it is determined that the (N−1)th electrical circuit breaker (not shown) is not faulty or that the system abnormality is not detected, the Nth electrical circuit breaker 40 will receive a power-good signal, and the Nth electrical circuit breaker 40 will be enabled.

At block 90, a detection is executed at the Nth electrical circuit breaker 40 to determine whether the Nth electrical circuit breaker 40 is faulty or whether there is a system abnormality. For example, if an abnormal current which is much higher than the rated current or an abnormal voltage level is detected at, the Nth electrical circuit breaker 40, it will be determined that the Nth electrical circuit breaker 40 is faulty or that the system abnormality is detected.

At block 92, if it is determined that the Nth electrical circuit breaker 40 is faulty or that the system abnormality is detected, both the Nth electrical circuit breaker 40 and the power supply unit 4 will be turned off. For example, the Nth electrical circuit breaker 40 is turned off by means of a controller (not shown) thereof, and the power supply unit 4 is turned off according to a signal indicative of a detected fault generated by the controller of the Nth electrical circuit breaker 40.

At block 94, if it is determined that the Nth electrical circuit breaker 40 is not faulty or that the system abnormality is not detected, the system 10 will continue to operate well.

Figure 3:
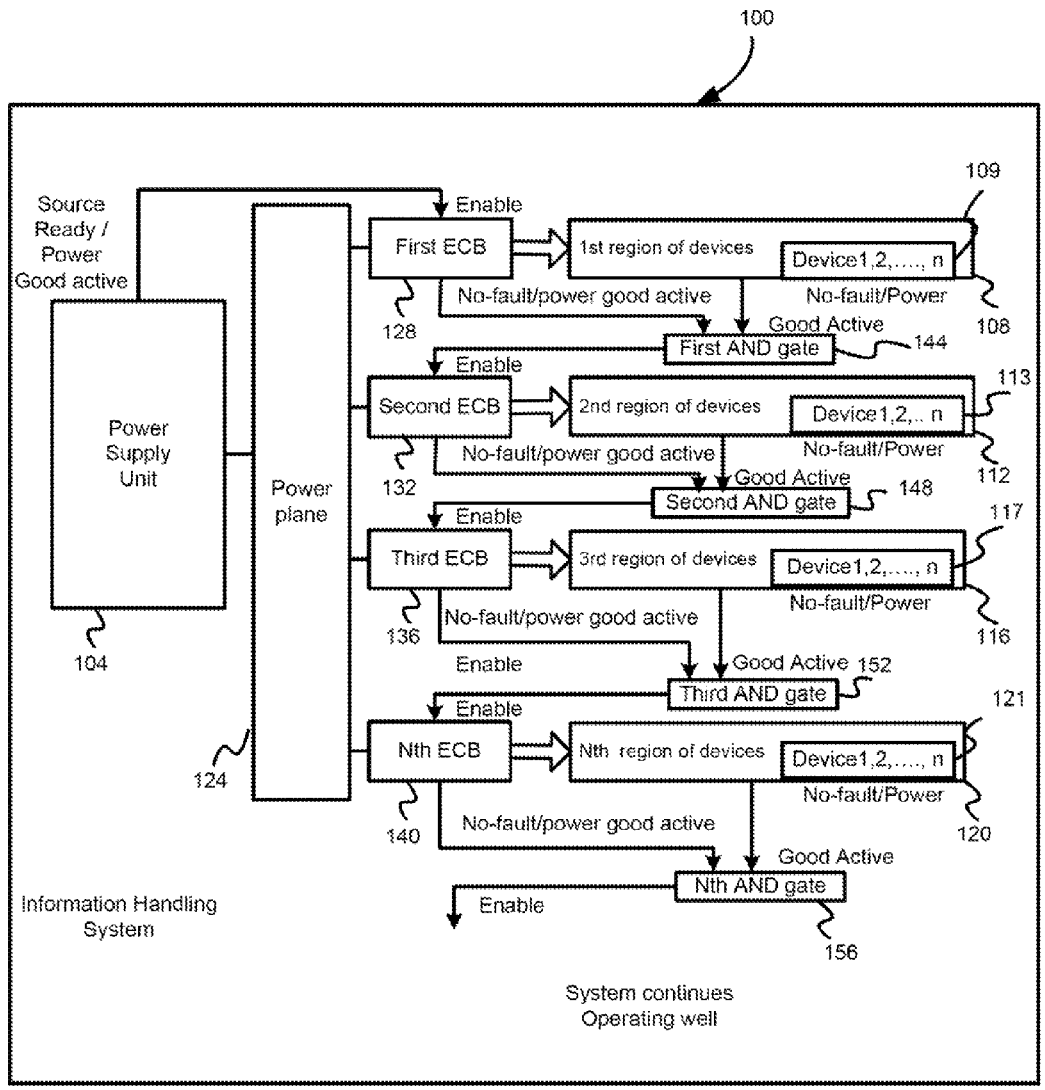
FIG. 3 depicts a block diagram of an information handling system, according to some other embodiments.

FIG. 3 depicts a block diagram of an information handling system, according to some other embodiments. FIG. 3 depicts the hardware architecture of an information handling system 100. In some embodiments, the information handling system 100 comprises a power supply unit 104, a first region of devices 108, a second region of devices 112, a third region or devices 116, . . . , and an Nth region of devices 120. A power plane 124 is electrically coupled to the power supply unit 104. A first electrical circuit breaker (first ECB) 128, a second electrical circuit breaker (second ECB) 132, a third electrical circuit breaker (third ECK) 136, . . . , and an Nth electrical circuit breaker (Nth ECB) 140 are electrically coupled to the power plane 124, the first region of devices 108, the second region of devices 112, the third region of devices 116, . . . , and the Nth region of devices 120, respectively. The information handling system 100 further comprises: a first AND gate 144 for performing "AND" operation on signals transmitted by the first region of devices 108 and the first electrical circuit breaker 128; a second AND gate 148 for performing "AND" operation on signals transmitted by the second region of devices 112 and the second electrical circuit breaker 132; a third AND gate 152 for performing "AND" operation on signals transmitted by the third region of devices 116 and the third electrical circuit breaker 136; . . . , and an Nth AND gate 156. The details and operation of the components of the information handling system 100 are described later.

In some embodiments, the first region of devices 108, the second region of devices 112, the third region of devices 116, . . . , the Nth region of devices 120, the first electrical circuit breaker 128, the second electrical circuit breaker 132, the third electrical circuit breaker 136, . . . , and the Nth electrical circuit breaker 140 are disposed on a printed circuit board. The aforesaid components of which quantity can change as needed, are operably interconnected. Optionally, the aforesaid components can communicate with each other or with the other components (not shown). The first region of devices 108, the second region of devices 112, the third region of devices 116, . . . , and the Nth region of devices 120 include functional modules, circuits, or devices in any forms, for example, including but not limited to a central processing unit (CPU), a memory, a hard disk drive, a voltage regulator module, and/or a module with a plurality of semiconductor components, such as a module with complementary metal-oxide semiconductor components (including P-channel metal-oxide semiconductor components and N-channel metal-oxide semiconductor components). For example, the first region of devices 108 comprises 1, 2, . . . n devices 109, the second region of devices 112 comprises 1, 2, . . . , n devices 113, the third region of devices 116 comprises 1, 2, . . . , n devices 117, and the Nth region of devices 120 comprises 1, 2, . . . n devices 121.

The first electrical circuit breaker 128, the second electrical circuit breaker 132, the third electrical circuit breaker 136, . . . , and the Nth electrical circuit breaker 140 not only provide protection to the regions (i.e., the first region of devices 108, the second region of devices 112, the third region of devices 116, . . . and the Nth region of devices 120) but also provide a convenient way of shutting down the regions.

Figure 4A:
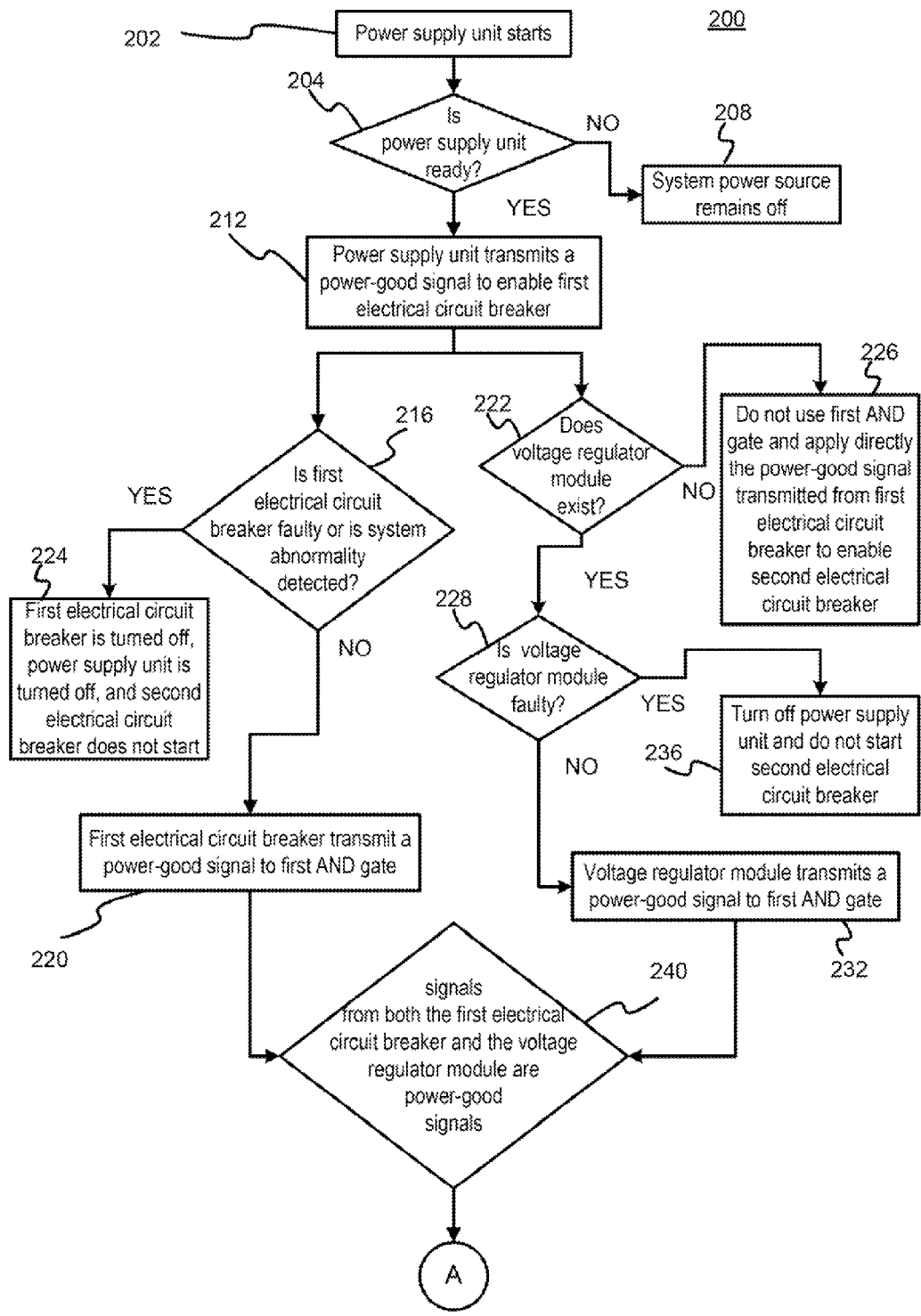
FIGS. 4A-4C depict flow charts of a power distribution method, according to some other embodiments.
Figure 4B:
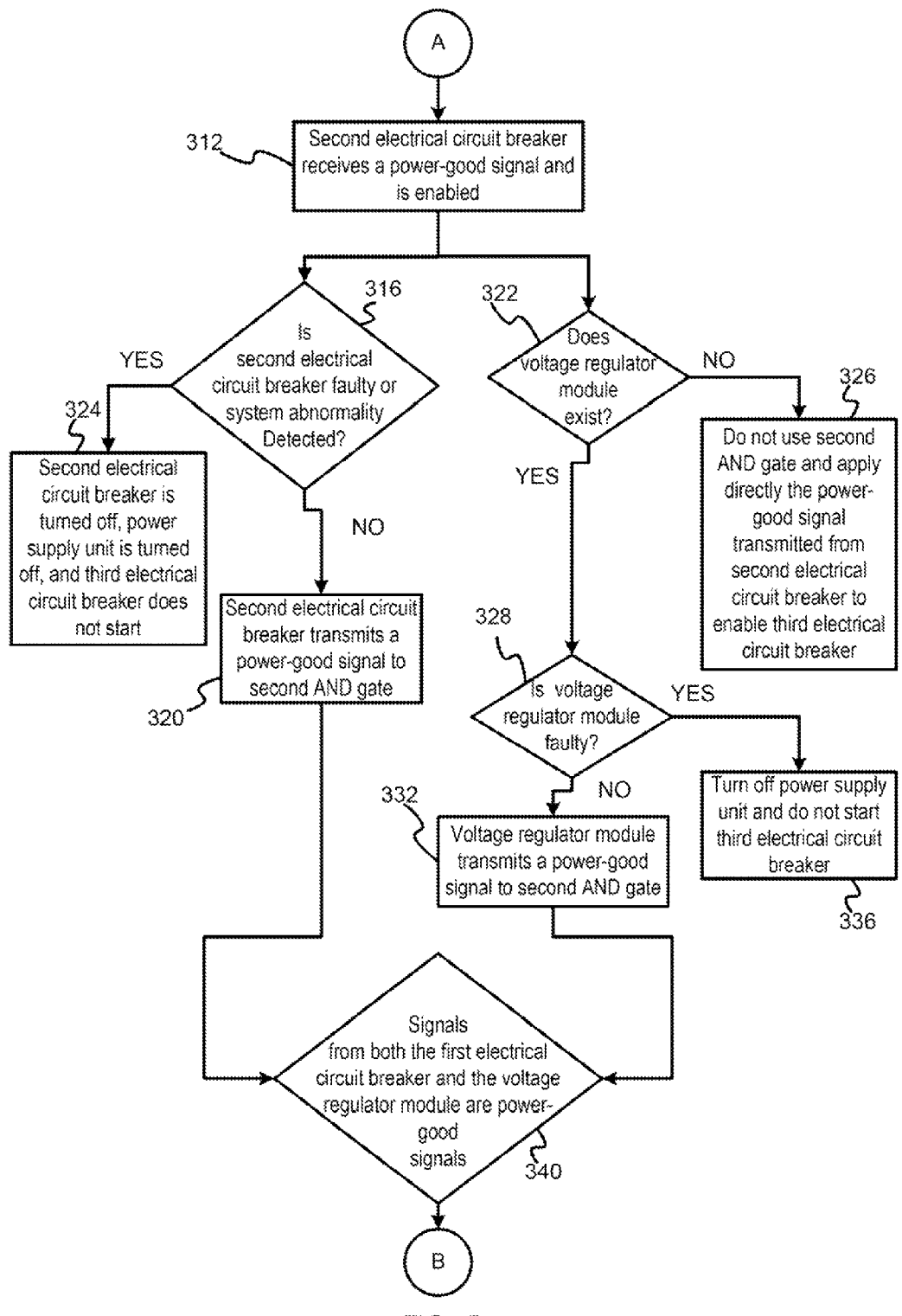
Figure 4C:
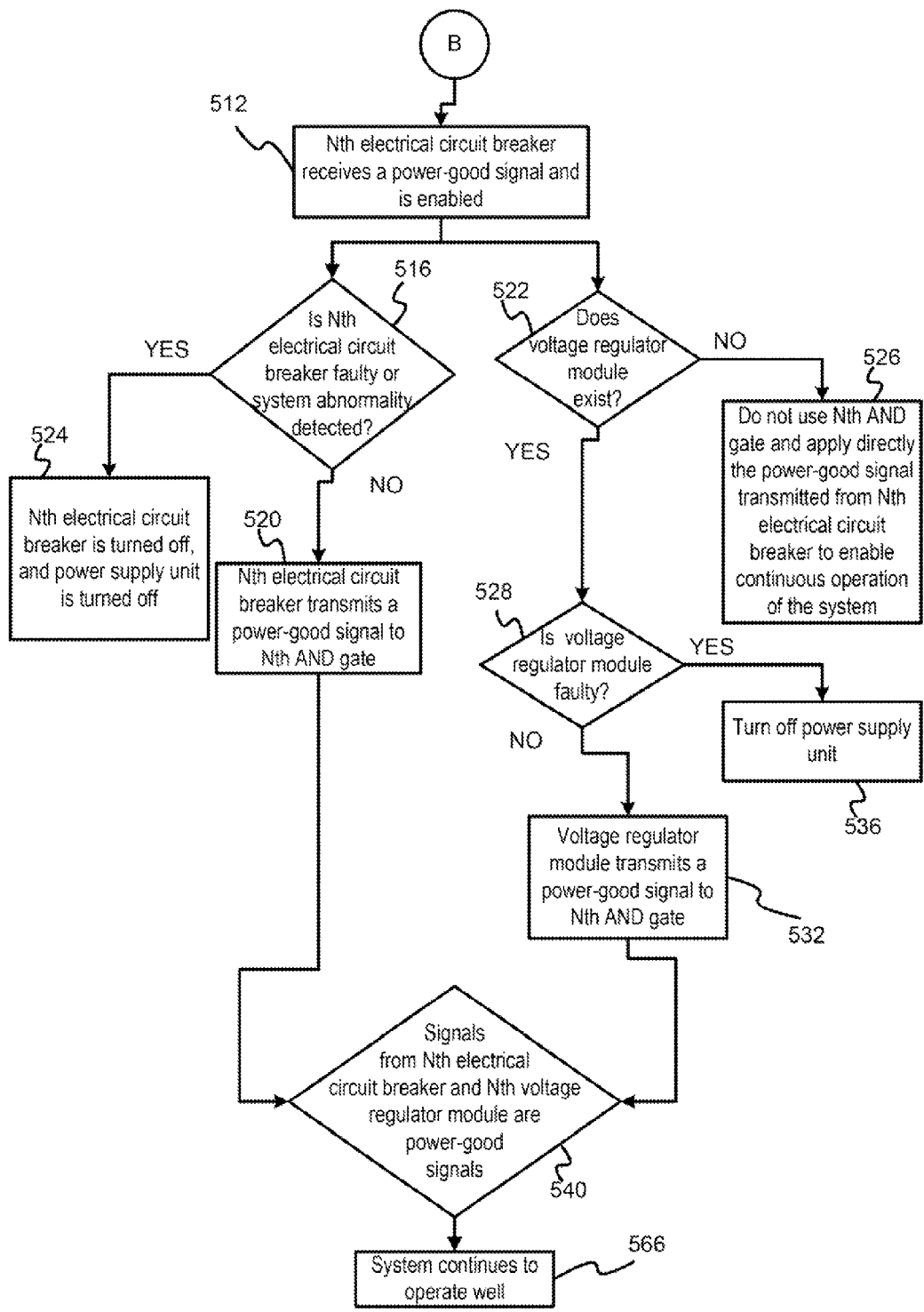

A power distribution technology provided according to some embodiments is illustrated with the hardware architecture shown in FIG. 3 and flow charts shown in FIGS. 4A-4C. FIGS. 4A-4C depict flow charts of a power distribution method, according to some other embodiments. FIGS. 4A-4C include transition points A-B for transition among the flow charts. FIGS. 4A-4C depict flow charts 200 for use with the information handling system 100.

At block 202, the power supply unit 104 starts.

At block 204, a determination is made of whether the power supply unit 104 is ready. In some embodiments, if the voltage does not reach a predetermined level or a power-good signal is not transmitted, it will be determined that the power supply unit 104 is not ready. If the voltage reaches a predetermined level or a power-good signal is transmitted, it will be determined that the power supply unit 104 is ready.

At block 208, if it is determined that the power supply unit 104 is not ready, the system power source of the information handling system 100 will remain off in some embodiments, the power supply unit 104 is a single power source of the information handling system 100. If the power supply unit 104 is not ready, the information handling system 100 will keep its original state, that is, the off state.

At block 212 it is determined that the over supply unit 104 is ready, power supply unit 104 will transmit a power-good signal to the first electrical circuit breaker 128, wherein the power-good signal functions as an enabling signal to enable first electrical circuit breaker 128. Then, the process flow of the method continues at block 216 and block 222.

At block 216, a detection is executed at the first electrical circuit breaker 128 to determine whether the first electrical circuit breaker 128 is faulty or whether there is a system abnormality. For example, if an abnormal current which is much higher than the rated current or an abnormal voltage level is detected at the first electrical circuit breaker 128, it will be determined that the first electrical circuit breaker 128 is faulty or that the system abnormality is detected.

At block 220, if it is determined that the first electrical circuit breaker 128 is not faulty or that the system abnormality is not detected, the first electrical circuit breaker 128 will transmit a power-good signal to the first AND gate 144. Then, the process flow of the method continues at block 240.

At block 224, if it is determined that the first electrical circuit breaker 128 is faulty or that the system abnormality is detected, both the first electrical circuit breaker 128 and the power supply unit 104 will be turned off, and the second electrical circuit breaker 132 will not start. In some embodiments, the first electrical circuit breaker 128 is turned off by means of a controller (not shown) thereof, and the power supply unit 104 is turned off according to a signal indicative of a detected fault generated by the controller of the first electrical circuit breaker 128. In some embodiments, the first electrical circuit breaker 128 does not send any signal to start the other subsequent electrical circuit breaker (such as the second electrical circuit breaker 132).

At block 222, the first region of devices 108 performs a self-test to determine whether a specific module, circuit, or device 109 exists in first region of devices 108. In some embodiments, whether the first voltage regulator module 109 exists is determined. If the first voltage regulator module 109 does not exist, then the process flow of the method will continue at block 226. If the first voltage regulator module 109 exists, then the process flow of the method will continue at block 228. The specific module, circuit, or device 109 in the first region of devices 108 is not necessarily a voltage regulator module, and can be any other appropriate module, circuit, or device.

At block 226, the first AND gate 144 is unnecessarily used and the power good signal transmitted from the first electrical circuit breaker 128 is directly applied to enable the second electrical circuit breaker 132.

At block 228, whether the specific module, circuit, or device 109 in the first region of devices 108 is faulty is determined. In some embodiments, whether the first voltage regulator module 109 is faulty is determined. For example, according to the health state of the first voltage regulator module 109, the first voltage regulator module 109 is faulty if no power-good signal is sent. If it is determined that the first voltage regulator module 109 is faulty, then the process flow of the method continues at block 236. If it is determined that the first voltage regulator module 109 is not faulty, then the process flow of the method continues at block 232.

At block 232, a power-good signal is transmitted from the specific module, circuit, or device 109 in the first region of devices 108 to the first AND gate 144. In some embodiments, the first voltage regulator module 109 transmits a power-good signal to the first AND gate 144.

At block 236, the power supply unit 104 is turned off and the second electrical circuit breaker 132 does not start.

At block 240, the first AND gate 144 receives a power-good signal from the first electrical circuit breaker 128 and a power-good signal, if any, from the specific module, circuit, or device 109 in the first region of devices 108. In some embodiments, the first AND gate 144 receives a power-good signal from the first electrical circuit breaker 128, and the first AND gate 144 receives a power-good signal, if any, from the first voltage regulator module 109.

At block 312, a power-good signal is transmitted from the first AND gate 144 to the second electrical circuit breaker 132, wherein the power-good signal functions as an enabling signal to enable the second electrical circuit breaker 132, and then the process flow of the method continues at block 316 and block 322.

At block 316, a detection is executed at the second electrical circuit breaker 132 to determine whether the second electrical circuit breaker 132 is faulty or whether there is a system abnormality. In some embodiments, if an abnormal current which is much higher than the rated current or an abnormal voltage level is detected at the second electrical circuit breaker 132, it will be determined that the second electrical circuit breaker 132 is faulty or that the system abnormality is detected.

At block 320, if it is determined that the second electrical circuit breaker 132 is not faulty or that the system abnormality is not detected, the second electrical circuit breaker 132 will transmit a power-good signal to the second AND gate 148, and then the process flow of the method continues at block 340.

At block 324, if it is determined that the second electrical circuit breaker 132 is faulty or that the system abnormality is detected, both the second electrical circuit breaker 132 and the power supply unit 104 will be turned off and the third electrical circuit breaker 136 will, not start. In some embodiments, the second electrical circuit breaker 132 is turned off by means of a controller (not shown) thereof and the power supply unit 104 is turned off according to a signal indicative of a detected fault generated by the controller of the second electrical circuit breaker 132. In some embodiments, the second electrical circuit breaker 132 does not send any signal to start the other subsequent electrical circuit breaker such as third electrical circuit breaker 136).

At block 322, the second region of devices 112 performs a self-test to determine whether a specific module, circuit, or device 113 exists in second region of devices 112. In some embodiments, whether the second voltage regulator module 113 exists is determined. If the second voltage regulator module 113 does not exist, then the process flow of the method continues at block 326. If the second voltage regulator module 113 exists, then the process flow of the method continues at block 328. Of course, the specific module, circuit, or device 113 in the second region of devices 112 is not necessarily a voltage regulator module, and can be any other appropriate module, circuit, or device.

At block 326, the second ANT) gate 148 is unnecessarily used and the power-good signal transmitted from the second electrical circuit breaker 132 is directly applied to enable the third electrical circuit breaker 136.

At block 328, whether the specific module, circuit, or device 113 in the second region of devices 112 is faulty is determined. In some embodiments, whether the second voltage regulator module 113 is faulty is determined. For example, according to the health state of the second voltage regulator module 113, the second voltage regulator module 113 is faulty if no power-good signal is sent. If it is determined that the second voltage regulator module 113 is faulty, then the process flow of the method continues at block 336. Hit is determined that the second voltage regulator module 113 is not faulty, then the process flow of the method continues at block 332.

At block 332, a power-good signal is transmitted from the specific module, circuit, or device 113 in the second region of devices 112 to the second AND gate 148. In some embodiments, the second voltage regulator module 113 transmits a power-good signal to the second AND gate 148.

At block 336, the power supply unit 104 is turned off and the third electrical circuit breaker 136 does not start.

At block 340, the second AND gate 148 receives a power-good signal from the second electrical circuit breaker 132 and a power-good signal, if any, from the specific module, circuit, or device 113 in the second region of devices 112. In some embodiments, the second AND gate 148 receives a power-good signal from the second electrical circuit breaker 132, and the second AND gate 148 receives a power-good signal, if any, from the first voltage regulator module 113.

The subsequent AND gates, the electrical circuit breakers, the regions of devices, and the specific modules in regions of devices can act according to the aforesaid operations at block 212 through block 240 or block 312 through block 340.

Hence, the operations performed on the Nth AND gate 156, the Nth electrical circuit breaker 140, and the Nth region of devices 120 are as follows.

At block 512, a power-good signal is transmitted from the (N−1)th AND gate (not shown) to the Nth electrical circuit breaker 140, wherein the power-good signal functions as an enabling signal to enable the Nth electrical circuit breaker 140, and then the process flow of the method continues at block 516 and block 522.

At block 516, a detection is executed at the Nth electrical circuit breaker 140 and according to its health state, whether the Nth electrical circuit breaker 140 is faulty or whether the system abnormality is detected is determined. In some embodiments, if an abnormal current which is much higher than the rated current or an abnormal voltage level is detected at the Nth electrical circuit breaker 140, it will be determined that the Nth electrical circuit breaker 140 is faulty or that the system abnormality is detected.

At block 520, if it is determined that the Nth electrical circuit breaker 140 is not faulty or that the system abnormality is not detected, the Nth electrical circuit breaker 140 will transmit a power-good signal to the Nth AND gate 156, and then the process flow of the method continues at block 540.

At block 524, if it is determined that the Nth electrical circuit breaker 140 is faulty or that the system abnormality is detected, both the Nth electrical circuit breaker 140 and the power supply unit 104 will be turned off. In some embodiments, the Nth electrical circuit breaker 140 is turned off by means of a controller (not shown) thereof, and the power supply unit 104 is turned off according to a signal indicative of a detected fault generated by the controller of the Nth electrical circuit breaker 140.

At block 522, the Nth electrical circuit breaker 140 performs a self-test to determine whether a specific module, circuit, or device 121 exists in Nth region of devices 120. In some embodiments, whether the Nth voltage regulator module 121 exists is determined. If the Nth voltage regulator module 121 does not exist, then the process flow of the method continues at block 526. If the Nth voltage regulator module 121 exists, then the process flow of the method continues at block 528. Of course, the specific module, circuit, or device 121 in the Nth region of devices 120 is not necessarily a voltage regulator module, and can be the other appropriate module, circuit, or device.

At block 526, the Nth AND) gate 148 is unnecessarily used and the power-good signal transmitted from the Nth electrical circuit breaker 140 is directly applied to enable the continuous operation of the system 100.

At block 528, whether the specific module, circuit, or device 121 in Nth region of devices 120 is faulty is determined. In some embodiments, whether the Nth voltage regulator module 121 is faulty is determined. For example, according to the health state of the Nth voltage regulator module 121, the Nth voltage regulator module 121 is faulty if no power-good signal is sent. If it is determined that the Nth voltage regulator module 121 is faulty, then the process flow of the method continues at block 536. If it is determined that the Nth voltage regulator module 121 is not faulty, then the process flow of the method continues at block 532.

At block 532, a power-good signal is transmitted from the specific module, circuit, or device 121 in the Nth region of devices 120 to the Nth AND gate 156. In some embodiments, the Nth voltage regulator module 121 transmits a power-good signal to the Nth AND gate 156.

At block 536, the power supply unit 104 is turned off.

At block 540, the Nth AND gate 156 receives a power-good signal from the Nth electrical circuit breaker 140 and a power-good signal, if any, from the specific module, circuit, or device 121 in the Nth region of devices 120. In some embodiments, the Nth AND gate 156 receives a power-good signal from the Nth electrical circuit breaker 140, and the Nth AND gate 156 receives a power-good signal, if any, from the Nth voltage regulator module 121.

At block 566, the normal operation of the system 100 is performed.

Figure 5:
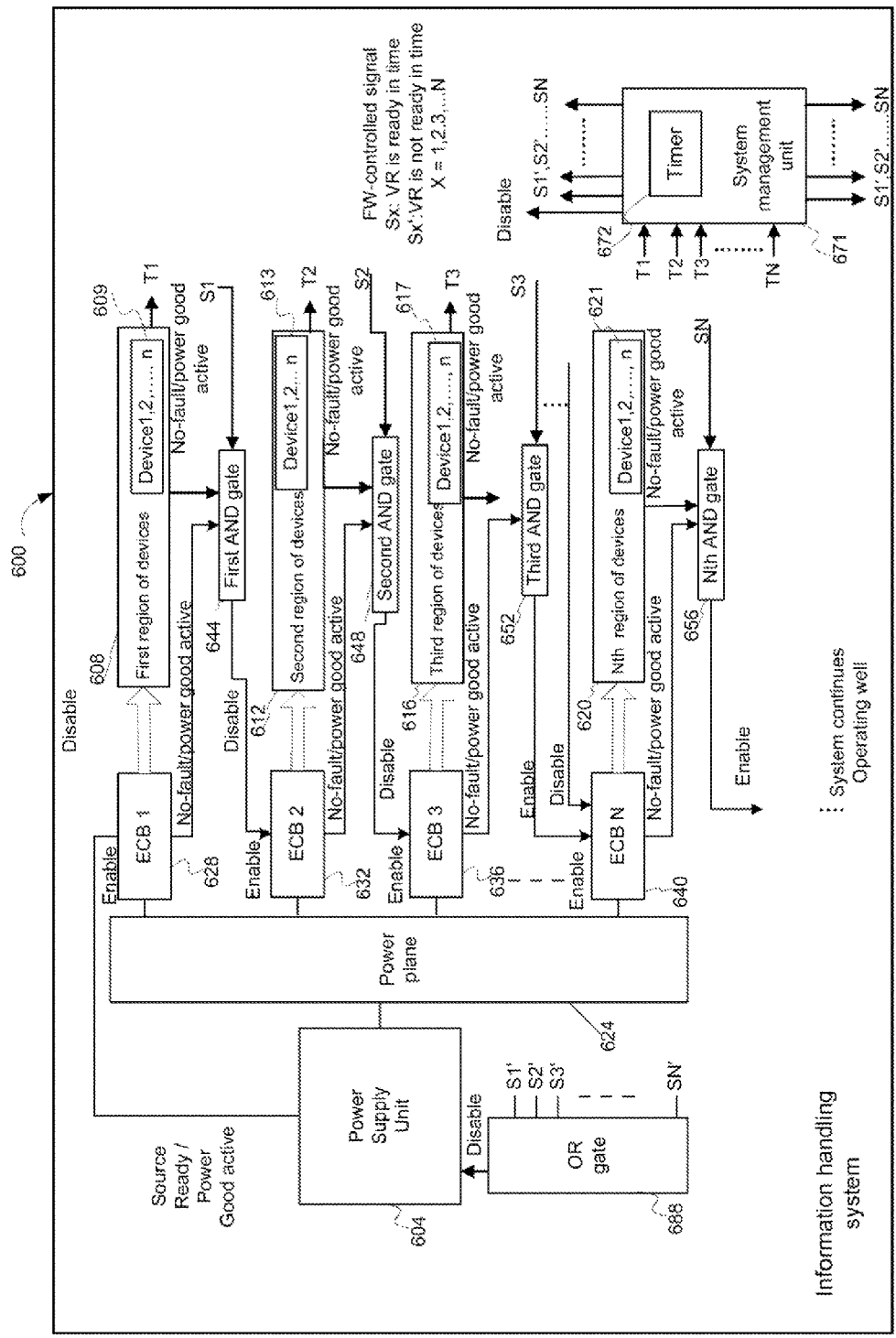
FIG. 5 depicts a block diagram of an information handling system, according to some other embodiments.

FIG. 5 depicts a block diagram of an information handling system, according to some other embodiments. FIG. 5 depicts the hardware architecture of an information handling system 600. In some embodiments, the information handling system 600 comprises a power supply unit 604, a first region of devices 608, a second region of devices 612, a third region of devices 616, . . . , and an Nth region of devices 620. A power plane 624 is electrically coupled to the power supply unit 604. A first electrical circuit breaker (first ECB) 628, a second electrical circuit breaker (second ECB) 632, a third electrical circuit breaker (third ECM 636, and an Nth electrical circuit breaker (Nth ECB) 640 are electrically coupled to the power plane 624, the first region of devices 608, the second region of devices 612, the third region of devices 616, . . . , and the Nth region of devices 620, respectively.

The information handling system 600 comprises an OR gate 688 electrically coupled to the power supply unit 604. The information handling system 600 further comprises a first AND gate 644, a second AND gate 648, a third AND gate 652, . . . , and an Nth AND gate 656.

The information handling system 600 further comprises a system management unit 671 and a timer 672. The tinier 672 and the system management unit 671 are either separated from each other or integrated with each other. Alternatively, the timer 672 is embedded in the system management unit 671. In some embodiments, the system management unit 671 is a baseboard management controller (BMC) which usually applies to a server system and includes, but is not limited to, BMC firmware stored in a flash chip. In some embodiments, the system management unit 671 includes, but is not limited to, an integrated management module (iMM). Basically, the constitution of the iMM is similar to that of the baseboard management controller and comprises an integrated management module firmware (iMM firmware, not shown) for managing the information handling system 600, so as to integrate service processor functions, super I/O, a video controller, and remote-end capacity into a chip (not shown) on a motherboard of the information handling system 600. Furthermore, the iMM firmware comprises instructions and routines for executing related functions disclosed herein. In some embodiments, the system management unit 671 can be referred to iLo (integrated lights-out) baseband management controllers. The system management unit 671 can also be any other independent controller.

Referring to FIG. 5, inputs of the timer 672/the system management unit 671 are denoted by T1, T2, T3, ..., Tn, whereas the outputs of the timer 672/the system management unit 671 fall into three categories, namely S1, S2, S3, ..., Sn, S1', S2', S3', ..., Sn', and Disable. T1, T2, T3, ..., Tn are electrically coupled to the first region of devices 608, the second region of devices 612, the third region of devices 616, ..., and the Nth region of devices 620, respectively. S1, S2, S3, ..., Sn are electrically coupled to the first AND gate 644, the second AND gate 648, the third AND gate 652, ..., and the Nth AND gate 656, respectively. S1', S2', S3', ..., Sn' are electrically coupled to the OR gate 688, respectively. Disable is electrically coupled to the first electrical circuit breaker 628, the second electrical circuit breaker 632, the third electrical circuit breaker 636, and the Nth electrical circuit breaker 640, respectively. Given x=1, 2, 3, ..., n, the signal of Sx indicates that specific devices 609, 613, 617, ..., 621 are ready in a predetermined period of time. The signal of Sx' indicates that specific devices 609, 613, 617, ..., 621 are not ready in a predetermined period of time. The signal of Disable indicates disable. The signal of Tx is a reference signal employed by the timer 672/the system management unit 671 to start timing, and is, basically, an enabling signal of a specific module, circuit, or device in a region of devices. For example, in some embodiments, T1 denotes a signal transmitted by the first region of devices 608 and functions as the reference signal for use with the timer 672/the system management unit 671 to start timing. The other signals are defined in a manner similar to the above-mentioned. The details and operation of the aforesaid components are described later.

The first AND gate 644 performs "AND" operation on S1 and signals transmitted from the first region of devices 608 and the first electrical circuit breaker 628. The second AND gate 648 performs "AND" operation on S2 and signals transmitted from the second region of devices 612 and the second electrical circuit breaker 632. The third AND gate 652 performs "AND" operation on S3 and signals transmitted from the third region of devices 616 and the third electrical circuit breaker 636. The Nth AND gate 656 performs "AND" operation on Sn and signals transmitted from the Nth region of devices 620 and the Nth electrical circuit breaker 640.

In some embodiments, the first region of devices 608, the second region of devices 612, the third region of devices 616, ..., the Nth region of devices 620, the first electrical circuit breaker 628, the second electrical circuit breaker 632, the third electrical circuit breaker 636, ..., and the Nth electrical circuit breaker 640 are disposed on a printed circuit board. The aforesaid components of which quantity can change as needed, are operably interconnected. Optionally, the aforesaid components can communicate with each other or with the other components (not shown). The first region of devices 608, the second region of devices 612, the third region of devices 616, ..., and the Nth region of devices 620 include functional modules, circuits, or devices in any forms, for example, including a central processing unit (CPU), a memory, a hard disk drive, a voltage regulator module, and/or a module with a plurality of semiconductor components, such as a module with complementary metal-oxide semiconductor components (including P-channel metal-oxide semiconductor components and N-channel metal-oxide semiconductor components). For example, the first region of devices 608 comprises 1, 2, ..., n devices 609. The second region of devices 612 comprises 1, 2, ..., n devices 613. The third region of devices 616 comprises 1, 2, ..., n devices 617. The Nth region of devices 620 comprises 1, 2, ..., n devices 621.

The first electrical circuit breaker 628, the second electrical circuit breaker 632, the third electrical circuit breaker 636, ..., and the Nth electrical circuit breaker 640 not only provide protection to the regions (i.e., the first region of devices 608, the second region of devices 612, the third region of devices 616, ..., and the Nth region of devices 620) but also provide a convenient way of shutting down the regions (modules).

Figure 6A:
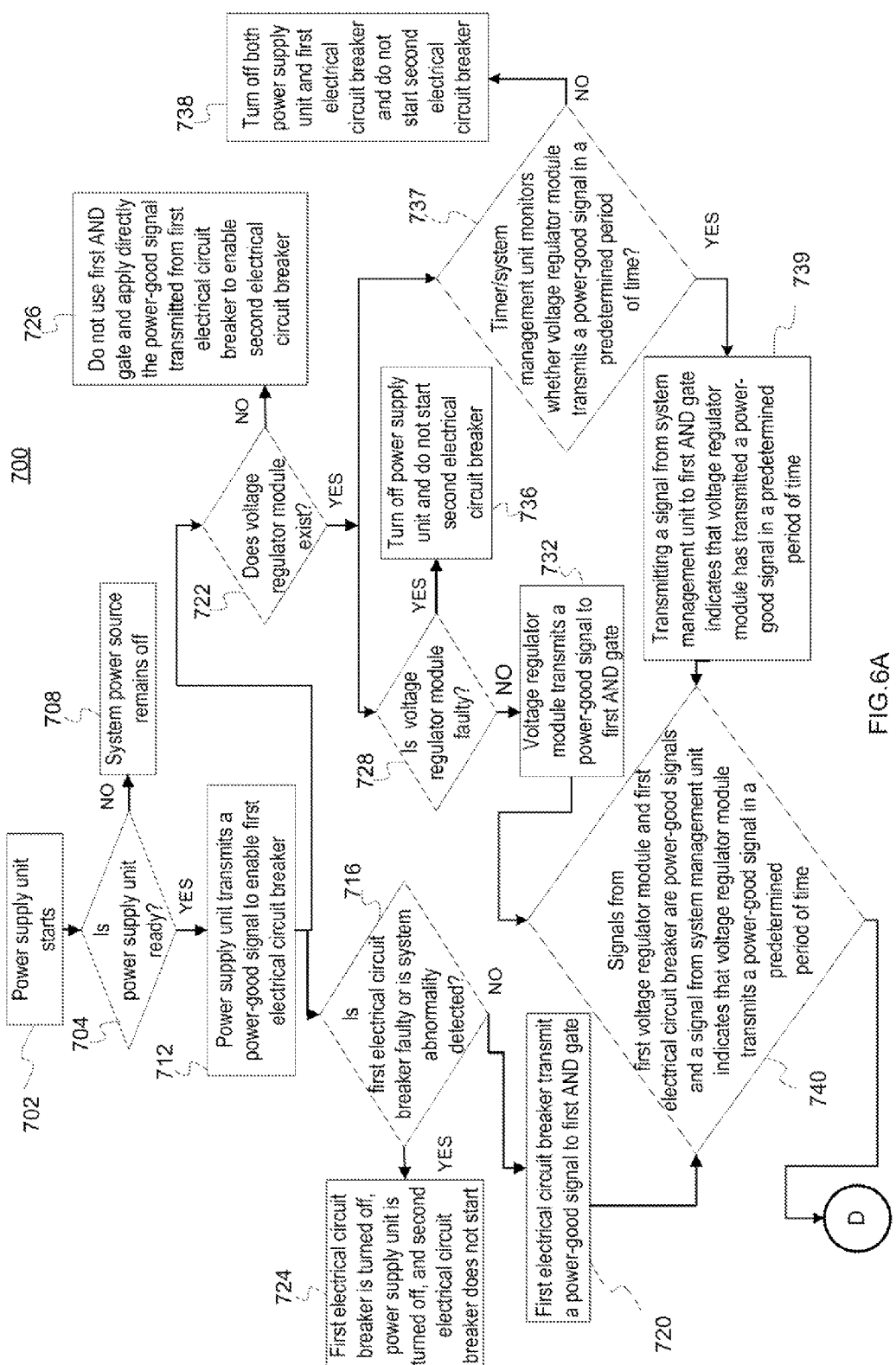
Figure 6B:
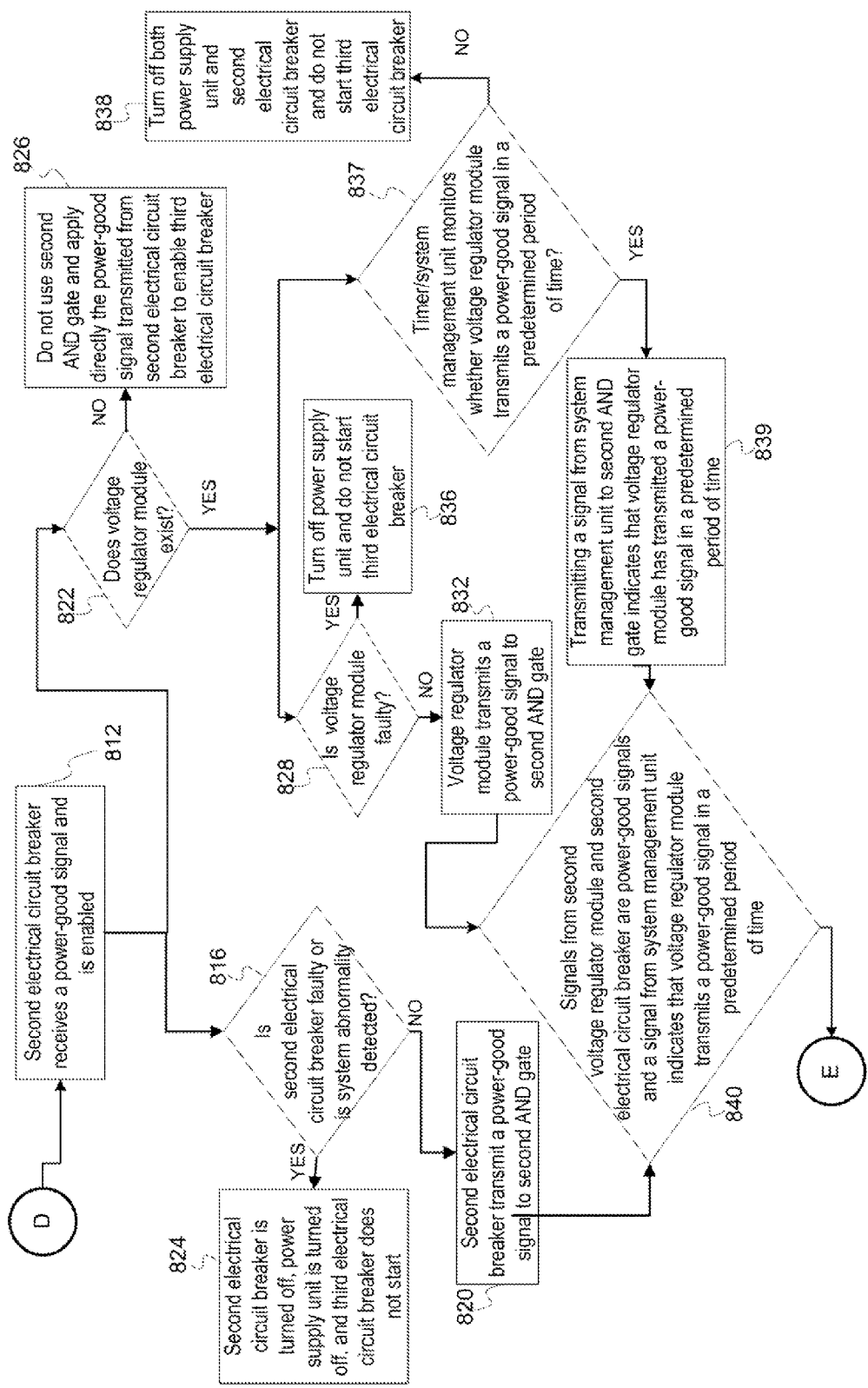

A power distribution technology provided according to some embodiments is illustrated with the hardware architecture shown in FIG. 5 and the flow charts shown in FIGS. 6A-6C. FIGS. 6A-6C depict flow charts of a power distribution method, according, to some other embodiments. FIGS. 6A-6C include transition points D-E for transition among the flow charts. FIGS. 6A-6C depict flow charts 700 for use with the information handling system 600.

At block 702, the power supply unit 604 starts.

At block 704, whether power supply unit 604 is ready is determined. In some embodiments, if the voltage does not reach a predetermined level or a power-good signal is not transmitted, it will be determined that the power supply unit 604 is not ready. If the voltage reaches a predetermined level or a power-good signal is transmitted, it will be determined that the power supply unit 604 is ready.

At block 708, if it is determined that the power supply unit 604 is not ready, the system power source of the information handling system 600 will remain off In some embodiments, the power supply unit 604 is a single power source of the information handling system 600. If the power supply unit 604 is not ready, the information handling system 600 will keep its original state, that is, the off state.

At block 712, if it is determined that the power supply unit 604 is ready, the power supply unit 604 will transmit a power-good signal to the first electrical circuit breaker 628, wherein the power-good signal functions as an enabling signal to enable first electrical circuit breaker 628. Then, the process flow of the method continue at block 716 and block 722.

At block 716, a detection is executed at the first electrical circuit breaker 628 and according to its health state, whether the first electrical circuit breaker 628 is faulty or whether the system abnormality is detected is determined. In some embodiments, if an abnormal current which is much higher than the rated current or an abnormal voltage level, is detected at the first electrical circuit breaker 628, it will be determined that the first electrical circuit breaker 628 is faulty or that the system abnormality is detected.

At block 720, if it is determined that the first electrical circuit breaker 628 is not faulty or that the system abnormality is not detected, the first electrical circuit breaker 628 will transmit a power-good signal to the first AND gate 644. Then, the process flow of the method continues at block 740.

At block 724, if it is determined that the first electrical circuit breaker 628 is faulty or that the system abnormality is detected, both the first electrical circuit breaker 628 and the power supply unit 604 will be turned off, and the second electrical circuit breaker 632 will not start. In some embodiments, the first electrical circuit breaker 628 is turned off by means of a controller (not shown) thereof, and the power supply unit 604 is turned off according to a signal indicative of a detected faith generated by the controller of the first electrical circuit breaker 628. Of course, the first electrical circuit breaker 628 does not send any signal to start the other subsequent electrical circuit breaker (such as the second electrical circuit breaker 632).

At block 722, the first region of devices 608 performs a self test to determine whether a specific module, circuit, or device 609 exists in the first region of devices 608. In some embodiments, whether the first voltage regulator module 609 exists is determined. If the first voltage regulator module 609 does not exist, then the process flow of the method continues at block 726. If the first voltage regulator module 609 exists, then the process flow of the method continues at block 728 and block 737. Of course, the specific module, circuit, or device 609 in the first region of devices 608 is not necessarily a voltage regulator module, and can be any other appropriate module, circuit, or device.

At block 726, the first AND gate 644 is unnecessarily used and the power-good signal transmitted from the first electrical circuit breaker 628 is directly applied to enable the second electrical circuit breaker 632.

At block 728, whether the specific module, circuit, or device 609 in the first region of devices 608 is faulty is determined. In some embodiments, whether the first voltage regulator module 609 is faulty is determined. For example, according to the health state of the first voltage regulator module 609, the first voltage regulator module 609 is faulty if no power-good signal is sent. If it is determined that the first voltage regulator module 609 is faulty, then the process flow of the method continues at block 736. If it is determined that the first voltage regulator module 609 is not faulty, then the process flow of the method continues at block 732.

At block 732, a power-good signal is transmitted from the specific module, circuit, or device 609 in the first region of devices 608 to the first AND gate 644. In some embodiments, the first voltage regulator module 609 transmits a power-good signal to the first AND gate 644.

At block 736, the power supply unit 604 is turned off and the second electrical circuit breaker 632 does not start.

At block 737, the timer 672/the system management unit 671 monitors whether the first voltage regulator module 609 transmits a power-good signal in a predetermined period of time. If the determination is negative, then the process flow of the method continues at block 738. If the determination is affirmative, then the process flow of the method continues at block 739.

At block 738, both the power supply unit 604 and the first electrical circuit breaker 628 are turned off and the second electrical circuit breaker 632 does not start.

At block 739, a signal is transmitted from the system management unit 671 to the first AND gate 644 to indicate that the first voltage regulator module 609 has transmitted a power-good signal in a predetermined period of time. Then, the process flow of the method continues at block 740.

At block 740, it is determined that the signals from the specific module, circuit, or device 609 in the first region of devices 608/from the first electrical circuit breaker 628 are power-good signals and the signal from the system management unit 671 indicates that the first voltage regulator module 609 transmits a power-good signal in a predetermined period of time. In some embodiments, it is determined that the signals from the first electrical circuit breaker 628/from the first voltage regulator module 609 are power-good signals and that the signal from the system management unit. 671 indicates that the first voltage regulator module 609 transmits a power-good signal in a predetermined period of time.

A block 812, a power-good signal is transmitted from first AND gate 644 to second electrical circuit breaker 632, wherein the power-good signal functions as an enabling signal to enable the second electrical circuit breaker 632. Then, the process flow of the method continues at block 816 and block 822.

At block 816, a detection is executed at the second electrical circuit breaker 632 and according to its health state, whether the second electrical circuit breaker 632 is faulty or whether the system abnormality is detected is determined. In some embodiments, if an abnormal current which is much higher than the rated current or an abnormal voltage level is detected at the second electrical circuit breaker 632, it will be determined that the second electrical circuit breaker 632 is faulty or that the system abnormality is detected.

At block 820, if it is determined that the second electrical circuit breaker 632 is not faulty or that the system abnormality is not detected, the second electrical circuit breaker 632 will transmit a power-good signal to the second AND gate 648. Then, the process flow of the method continue at block 840.

At block 824, if it is determined that the second electrical circuit breaker 632 is faulty or that the system abnormality is detected, both the second electrical circuit breaker 632 and the power supply unit 604 will be turned off and the third electrical circuit breaker 636 will not start, in some embodiments, the second electrical circuit breaker 632 is turned off by means of a controller (not shown) thereof, and the power supply unit 604 is turned off according to a signal indicative of a detected fault generated by the controller of the second electrical circuit breaker 632. Of course, the second electrical circuit breaker 632 does not send any signal to start the other subsequent electrical circuit breaker (such as the third electrical circuit breaker 636).

At block 822, the second region of devices 612 performs a self-test to determine whether a specific module, circuit, or device 613 exists in the second region of devices 612. In some embodiments, whether the second voltage regulator module 613 exists is determined. If the second voltage regulator module 613 does not exist, then the process flow of the method continue at block 826. If the second voltage regulator module 613 exists, then the process flow of the method continues at block 828 and block 837. Of course, the specific module, circuit, or device 613 in the second region of devices 612 is not necessarily a voltage regulator module, and can be any other appropriate module, circuit, or device.

At block 826, the second AND gate 648 is unnecessarily used and the power-good signal transmitted from the second electrical circuit breaker 632 is directly applied to enable the third electrical circuit breaker 636.

At block 828, whether the specific module, circuit, or device 613 in second region of devices 612 is faulty is determined. In some embodiments, whether second voltage regulator module 613 is faulty is determined. For example, according to the health state of the second voltage regulator module 613, the second voltage regulator module 613 is faulty if no power-good signal is sent. If it is determined that the second voltage regulator module 613 is faulty, then the process flow of the method continues at block 836. If it is determined that the second voltage regulator module 613 is not faulty, then the process flow of the method continues at block 832.

At block 832, a power-good signal is transmitted from the specific module, circuit, or device 613 in second region of devices 612 to the second AND gate 648. In some embodiments, the second voltage regulator module 613 transmits a power-good signal to the second AND gate 648.

At block 836 the power supply unit 604 is turned off and the third electrical circuit breaker 636 does not start.

At block 837, the timer 672/the system management unit 671 monitors whether the second voltage regulator module 613 transmits a power-good signal in a predetermined period of time. If the determination is negative, then the process flow of the method continues at block 838. If the determination is affirmative, then the process flow of the method continues at block 839.

At block 838, both the power supply unit 604 and the second electrical circuit breaker 632 are turned off and the third electrical circuit breaker 636 does not start.

At block 839, a signal is transmitted from the system management unit 671 to the second AND gate 648 to indicate that the second voltage regulator module 613 has transmitted a power-good signal in a predetermined period of time. Then, the process flow of the method continues at block 840.

At block 840, it is determined that the signals from the specific module, circuit, or device 613 in the second region of devices 612/from the second electrical circuit breaker 632 are power-good signals and the signal from the system management unit 671 indicates that the second voltage regulator module 613 transmits a power-good signal in a predetermined period of time. In some embodiments, it is determined that the signals from the second electrical circuit breaker 632/from second voltage regulator module 613 are power-good signals and that the signal from the system management unit 671 indicates that the second voltage regulator module 613 transmits a power-good signal in a predetermined period of time.

The subsequent AND gates, the electrical circuit breakers, the regions of devices, the specific modules in regions of devices, the OR gate 688, the power supply unit 604, the timer 672/the system management unit 671, and the power plane 624 can act according to the aforesaid operations at block 712 through block 740 or block 812 through block 840.

Hence, the operations performed on the Nth AND gate 656, the Nth electrical circuit breaker 640, and the Nth region of devices 620 are as follows.

At block 912, a power-good signal is transmitted from the (N−1)th AND gate (not shown) to the Nth electrical circuit breaker 640, wherein the power-good signal functions as an enabling signal to enable the Nth electrical circuit breaker 640. Then, the process flow of the method continues at block 916 and block 922.

At block 916, a detection is executed at the Nth electrical circuit breaker 640 and according, to its health state, whether the Nth electrical circuit breaker 640 is faulty or whether the system abnormality is detected is determined. In some embodiments, if an abnormal current which is much higher than the rated current or an abnormal voltage level is detected at the Nth electrical circuit breaker 640, it will be determined that the Nth electrical circuit breaker 640 is faulty or that the system abnormality is detected.

At block 920, if it is determined that the Nth electrical circuit breaker 640 is not faulty or that the system abnormality is not detected, the Nth electrical circuit breaker 640 will transmit a power-good signal to the Nth AND gate 656. Then, the process flow of the method continues at block 940.

At block 924, if it is determined that the Nth electrical circuit breaker 640 is faulty or that the system abnormality is detected, both the Nth electrical circuit breaker 640 and the power supply unit 604 will be turned off. In some embodiments, the Nth electrical circuit breaker 640 is turned off by means of a controller (not shown) thereof, and the power supply unit 604 is turned off according to a signal indicative of a detected fault generated by the controller of the Nth electrical circuit breaker 640.

At block 922, the Nth electrical circuit breaker 640 performs a self test to determine whether a specific module, circuit, or device 621 exists in the Nth region of devices 620. In some embodiments, whether the Nth voltage regulator module 621 exists is determined. If the Nth voltage regulator module 621 does not exist, then the process flow of the method continues at block 926. If the Nth voltage regulator module 621 exists, then the process flow of the method continues at block 928 and block 937. Of course, the specific module, circuit, or device 621 in the Nth region of devices 620 is not necessarily a voltage regulator module, and can be any other appropriate module, circuit, or device.

At block 926, the Nth AND gate 648 is unnecessarily used and the power-good signal transmitted from the Nth electrical circuit breaker 640 is directly applied to enable continuous operation of the system 600.

At block 928, whether a specific module, circuit, or device 621 in the Nth region of devices 620 is faulty is determined. In some embodiments, whether the Nth voltage regulator module 621 is faulty is determined. For example, according to the health state of the Nth voltage regulator module 621, the Nth voltage regulator module 621 is faulty if no power-good signal is sent. If it is determined that the Nth voltage regulator module 621 is faulty, then the process flow of the method continues at block 936. If it is determined that the Nth voltage regulator module 621 is not faulty, then the process flow of the method continues at block 932.

At block 932, a power-good signal is transmitted from the specific module, circuit, or device 621 in the Nth region of devices 620 to the Nth AND gate 656. In some embodiments, the Nth voltage regulator module 621 transmits a power-good signal to the Nth AND gate 656.

At block 936, the lower supply unit 604 is turned off.

At block 937, the timer 672/the system management unit 671 monitors whether the Nth voltage regulator module 621 transmits a power-good signal in a predetermined period of time. If the determination is negative, then the process flow of the method continues at block 938. If the determination is affirmative, then the process flow of the method continues at block 939.

At block 938, both the power supply unit 604 and the Nth electrical circuit breaker 640 are turned off.

At block 939, a signal is transmitted from the system management unit 671 to the Nth AND gate 656 to indicate that the Nth voltage regulator module 621 has transmitted a power-good signal in a predetermined period of time, and then the process flow of the method continues at block 940.

At block 940, it is determined that the signals from the specific module, circuit, or device 621 in the Nth region of devices 620/from the Nth electrical circuit breaker 640 are power-good signals and the signal from the system management unit 671 indicates that the Nth voltage regulator module 621 transmits a power-good signal in a predetermined period of time. In some embodiments, it is determined that the signals from the Nth electrical circuit breaker 640/from the Nth voltage regulator module 621 are power-good signals and the signal from the system management unit 671 indicates that the Nth voltage regulator module 621 transmits a power-good signal in a predetermined period of time.

At block 966, the continuous normal operation of the system 600 is performed.

Although the aforesaid embodiments are illustrated with voltage regulator modules, persons skilled in the art can easily infer other embodiments with the other related devices, including but not limited to a CPU, a memory, a fan, a hard disk drive, a RAID controller, or a PCIE card. Furthermore, the aforesaid embodiments are illustrated with N ECBs and N regions of devices, wherein N is an integer larger than or equal to 2, but embodiments not restrictive of N.

As will be appreciated by one skilled in the art, aspects of the present inventive subject matter may be embodied as a system, method or computer program product. Accordingly, aspects of the present inventive subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus or device, or any suitable combination of the foregoing. More specific examples (a non-exhaustive list) of the computer readable storage medium would include the following: an electrical connection having, one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks ill the flowchart illustrations anchor block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing, apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

While the embodiments are described with reference to various implementations and exploitations, it will be understood that these embodiments are illustrative and that the scope of the inventive subject matter is not limited to them. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the inventive subject matter, in general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method comprising:
   supplying power from a power supply to a first electrical circuit breaker, wherein a first electrical circuit is electrically coupled to receive the power from the power supply through the first electrical circuit breaker;

detecting, by the first electrical circuit breaker, whether at least one of a current and a voltage of the power has exceeded an operating threshold for the first electrical circuit;

in response to detecting that at least one of the current and the voltage of the power has exceeded the operating threshold for the first electrical circuit, shutting off the power supply and the first electrical circuit breaker, wherein the shutting off of the power supply prevents supplying the power from the power supply to a second electrical circuit breaker that is electrically coupled to a second electrical circuit to receive the power from the power supply; and in response to detecting that at least one of the current and the voltage of the power has not exceeded the operating threshold for the first electrical circuit, supplying the power from the power supply to the second electrical circuit breaker that is electrically coupled to the second electrical circuit, wherein a first input of an AND gate is electrically coupled to an output of the first electrical circuit breaker and a second input of the AND gate is electrically coupled to an output from a first electrical device in the first electrical circuit, wherein an output of the AND gate is electrically coupled to the second electrical circuit breaker.

2. The method of claim 1, further comprising transmitting a power-good signal from the first electrical circuit breaker to the AND gate in response to a determination that a fault does not exist in the first electrical circuit breaker.

3. The method of claim 2, comprising determining whether the first electrical device is faulty.

4. The method of claim 3, further comprising transmitting a different power-good signal from the first electrical device to the AND gate in response to a determination that the first electrical device is not faulty.

5. The method of claim 4, further comprising transmitting an output signal from the AND gate to the second electrical circuit breaker, in response to a condition that the first electrical circuit breaker transmits the power-good signal to the AND gate and the first device transmits the different power-good signal to the AND gate, to enable the second electrical circuit breaker.

6. The method of claim 5, wherein the first electrical device comprises a voltage regulator module.

7. An apparatus comprising:
a power supply to provide power;
a first circuit breaker coupled to the power supply, the first circuit breaker to provide a breaker power-good signal responsive to an operating characteristic of the power not exceeding an operating threshold;
a first electrical circuit to receive the power through the first circuit breaker;
a first electrical component of the first electrical circuit, the first electrical component to provide a component power-good signal responsive to the first electrical component being non-faulty;
a second circuit breaker coupled to the power supply;
a second electrical circuit to receive the power through the second circuit breaker; and
a component to control the second breaker to provide power to the second electrical circuit responsive to receiving both the breaker power-good signal and the component power-good signal.

8. The apparatus of claim 7, wherein the component is to control the second breaker to not provide power to the second electrical responsive to not receiving both the breaker power-good signal and the component power-good signal.

9. The apparatus of claim 7, wherein the component is to control the second breaker according to a logical AND of the breaker power-good signal and the component power-good signal.

10. The apparatus of claim 7, wherein the component is an AND gate.

11. The apparatus of claim 7, wherein the first circuit breaker is to not provide the breaker power-good signal responsive to the operating characteristic of the power exceeding the operating threshold.

12. The apparatus of claim 7, wherein the first electrical component is to not provide the component power-good signal responsive to the first electrical component being faulty.

13. The apparatus of claim 7, wherein the first electrical component is a voltage regulator.

14. A method comprising:
providing, by a first circuit breaker controlling power to a first electrical circuit, a breaker power-good signal responsive to an operating characteristic of the power not exceeding an operating threshold;
providing, by a first electrical component of the first electrical circuit, a component power-good signal responsive to the first electrical component being non-faulty; and
operating a second circuit breaker controlling the power to a second electrical circuit to provide the power to the second electrical circuit responsive to receiving both the breaker power-good signal and the component power-good signal.

15. The method of claim 14, further comprising:
operating the second circuit breaker not to provide the power to the second electrical circuit responsive to receiving only the breaker power-good signal.

16. The method of claim 14, further comprising:
operating the second circuit breaker not to provide the power to the second electrical circuit responsive to receiving only the component power-good signal.

17. The method of claim 14, further comprising:
operating the second circuit breaker not to provide the power to the second electrical circuit responsive to receiving neither the breaker power-good signal nor the component power-good signal.

18. The method of claim 14, wherein operating the second circuit breaker comprises:
controlling the second breaker according to a logical AND of the breaker power-good signal and the component power-good signal.

19. The method of claim 14, further comprising:
not providing, by the first circuit breaker, the breaker power-good signal responsive to the operating characteristic of the power exceeding the operating threshold.

20. The method of claim 14, further comprising:
not providing, by the first electrical component, the component power-good signal responsive to the first electrical component being faulty.

* * * * *